US006260184B1

(12) United States Patent
Brennan et al.

(10) Patent No.: US 6,260,184 B1
(45) Date of Patent: Jul. 10, 2001

(54) DESIGN OF AN INTEGRATED CIRCUIT BY SELECTIVELY REDUCING OR MAINTAINING POWER LINES OF THE DEVICE

(75) Inventors: Thomas C. Brennan; Michael Rohn, both of Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/175,668

(22) Filed: Oct. 20, 1998

(51) Int. Cl.$^7$ .................................................. G06F 17/50
(52) U.S. Cl. .................... 716/14; 716/1; 716/5; 326/41; 326/47; 326/101
(58) Field of Search .................. 716/1, 5, 6, 8, 716/14; 326/41, 47, 101

(56) References Cited

U.S. PATENT DOCUMENTS

| 4,698,760 | * | 10/1987 | Lembach et al. | 716/6 |
| 5,880,967 | * | 3/1999 | Jyu et al. | 716/6 |
| 5,917,729 | * | 6/1999 | Naganuma et al. | 716/8 |
| 5,926,397 | * | 7/1999 | Yamanouchi | 716/14 |
| 5,949,689 | * | 9/1999 | Olson et al. | 716/1 |
| 6,083,271 | * | 7/2000 | Morgan | 716/1 |
| 6,090,151 | * | 7/2000 | Gehman et al. | 716/5 |

OTHER PUBLICATIONS

Chao et al, "Floorplanning for Low Power Designs", IEEE International Symposium, vol. 1, pp. 45–48, 1995.*

Shepard et al., "Design Methodology for the S/390 Parallel Enterprise Server G4 Microprocessors," vol. 41, No. 4/5, IBM J. Res. Develop., Jul./Sep. 1997, pp. 515–547.

* cited by examiner

Primary Examiner—Matthew Smith
Assistant Examiner—Jibreel Speight
(74) Attorney, Agent, or Firm—Merchant & Gould; Roy W. Truelson

(57) ABSTRACT

A system and method for designing an integrated circuit device by selectively reducing power lines based on wiring demand of the device are provided. In one embodiment, a power demand value of a region of the device is determined and a wiring demand value of the region of the device is determined. Based on the wiring demand value and the power demand Value, power lines in the region are selectively reduced. These steps may be repeated for each region of the device and a new power line layout may be generated after stepping through each of the regions. The reduction of power lines may be repeated until an acceptable power line layout is produced. Based on this layout, detailed signal wiring can be performed. This technique can, for example, more efficiently allocate power lines and signal wires and increase the density of the integrated circuit chip.

18 Claims, 9 Drawing Sheets

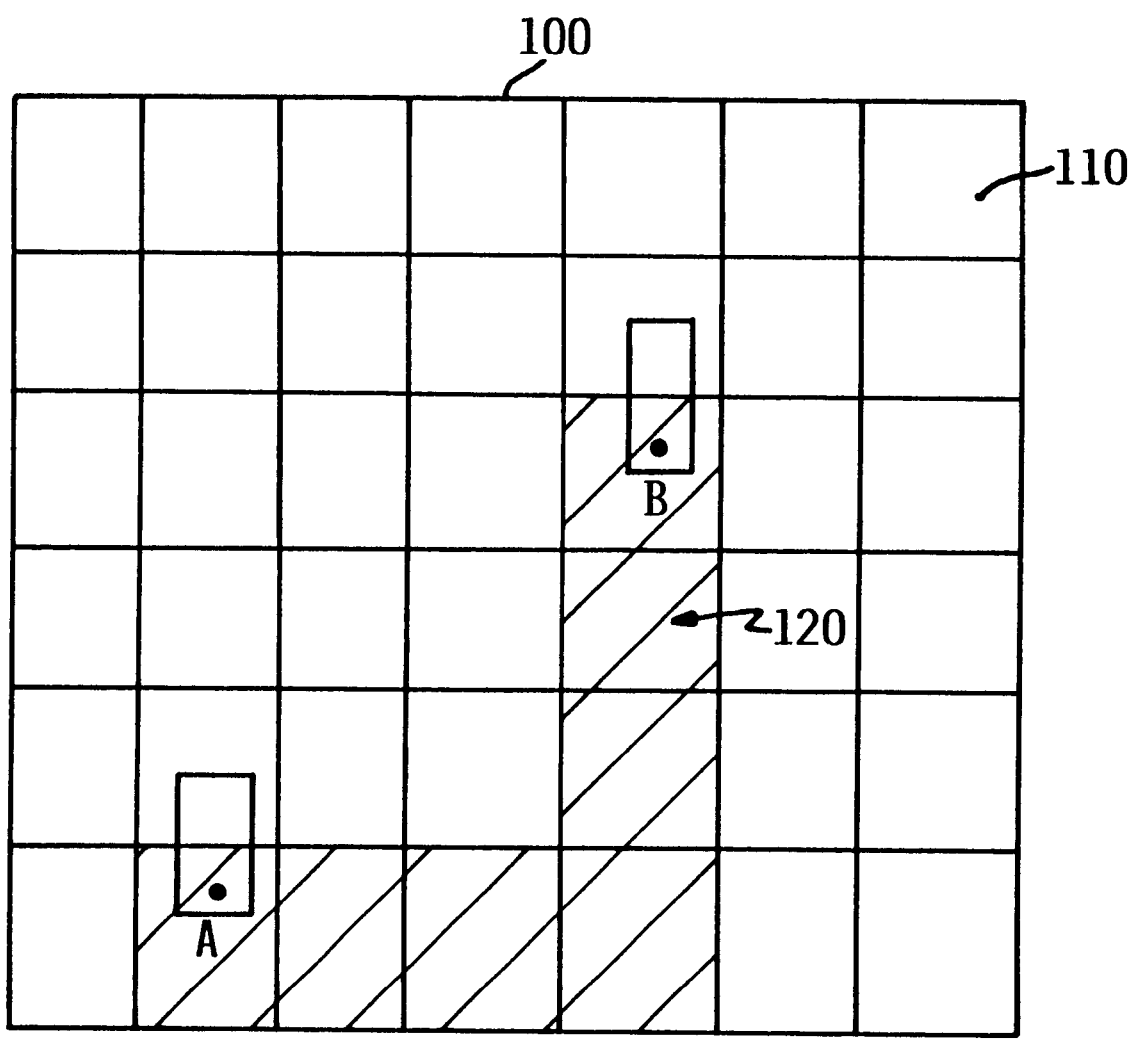
FIGURE IA

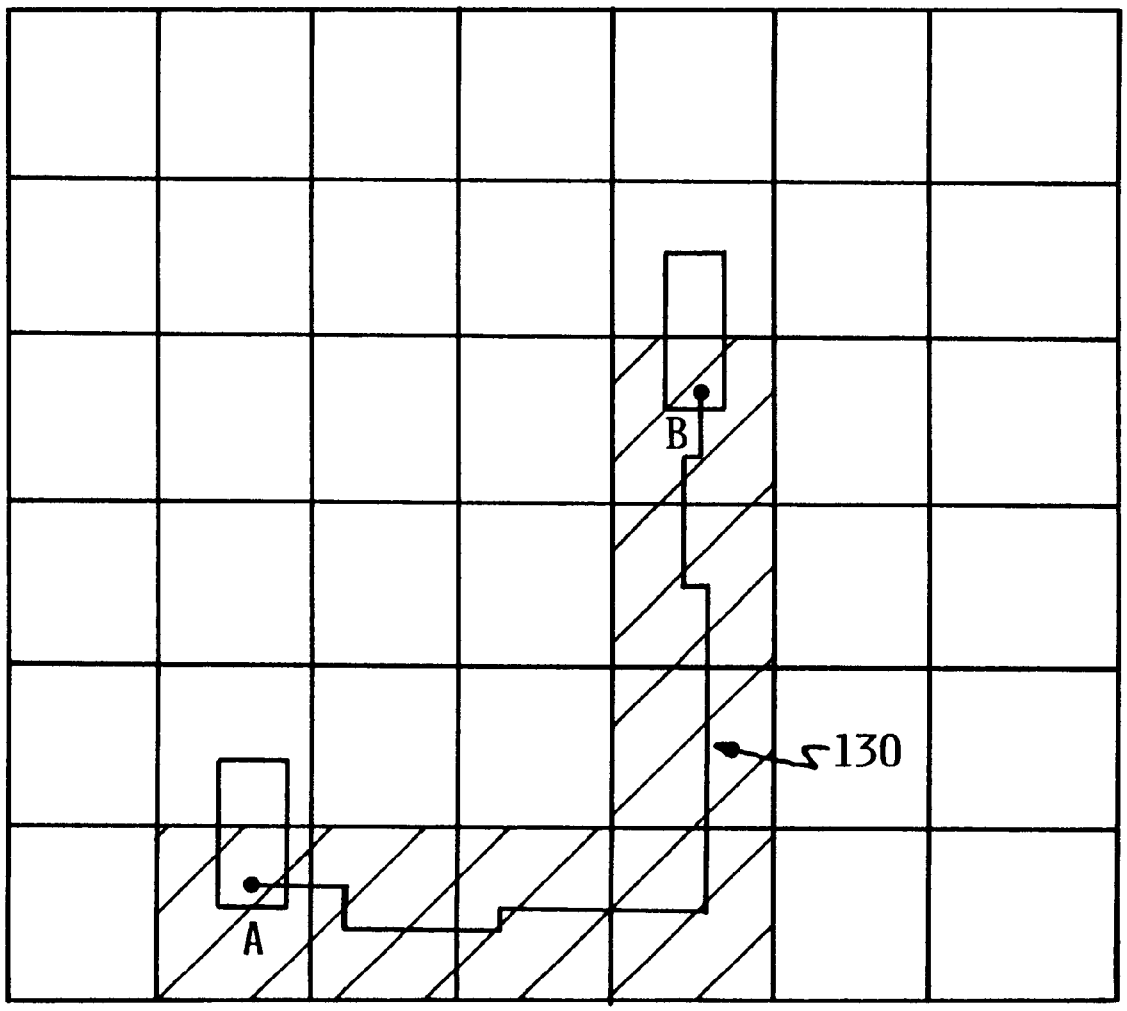
FIGURE IB

DESIGN OF AN INTEGRATED CIRCUIT BY SELECTIVELY REDUCING OR MAINTAINING POWER LINES OF THE DEVICE

FIELD OF THE INVENTION

The present invention is directed generally to the design of integrated circuit devices and, more particularly, to the design of an integrated circuit device by selectively reducing or maintaining power lines of the device.

BACKGROUND OF THE INVENTION

Integrated circuit devices are formed from a large number of interconnected integrated circuits. The active elements or transistors which make up the integrated circuits are typically fabricated in the lower layers of the integrated circuit device. Above the transistors, a number of metal layers are formed. The metal layers are used as power lines, which provide power to the integrated circuits, and as signal wires, which interconnect the integrated circuits and provide signal transmission therebetween.

During integrated circuit design, design engineers pay particular attention to the allocation of the metal layers between power lines and signal wires in order to ensure adequate power while achieving the most densely packed signal wiring. In a typical design approach, a software model containing the integrated circuits of the device is first developed using well known design techniques. The design engineer then develops a power line layout or grid for the modeled integrated circuit device. The power line layout is typically designed with moderate conservatism in order to ensure adequate power for the device. Next, signal wires are added to the integrated circuit model based on the layout of the integrated circuits on the device as well as the power line layout. Typically, the signal wires are automatically routed using software routing tools (hereinafter "routers"), such as G-Route™ by Cadence Design Systems, Inc.

The routing of signal wires typically includes two phases: a global phase and a detail phase. In the global phase, the router divides the entire integrated circuit device into squares or tiles, each of which contain a number of tracks in which signal wires may be routed. Using the global tiles the router generates, paths which interconnect the integrated circuits. FIG. 1A illustrates an exemplary portion 100 of an integrated circuit device divided up into tiles 110 and having two circuits A and B interconnected by a global path 120. In the detail phase, the router makes detailed signal wire routes between integrated circuits based on the global paths and the tracks of the tiles therein. FIG. 1B illustrates a signal wire 130 interconnecting circuits A and B after the detailed phase of wire routing. In some instances, after automatically routing signal wires, some routes between circuits will remain incomplete. These incomplete routes are then typically completed manually.

The above approach places significant limitations on the scaling of integrated circuit devices. For example, should an excessively conservative amount of metal be devoted to power lines, the integrated circuits may need to be spread out in order provide room for the signal wires. Spreading out of the integrated circuits increases the size of the device and may also negatively impact performance.

SUMMARY OF THE INVENTION

The present invention provides a system and method for designing an integrated circuit device by selectively reducing or maintaining power lines of the device. This can, for example, allow for more efficient allocation of power lines and signal wires and increase the density of the chip.

In accordance with one embodiment of the invention, a method of designing an integrated circuit device is provided. In this method, a power demand value of a region of the device is determined and a wiring demand value of the region of the device is determined. Based on the wiring demand value and the power demand value, power lines in the region are selectively maintained or reduced. These steps may be repeated for each region of the device and a new power line layout may be generated after stepping through each of the regions.

A system, in accordance with another embodiment of the invention, includes a power module, a wiring module, and a power line module. The power module determines power demand values for locations of the device. The wiring module determines wiring demand values for locations of the device. The power line module selectively maintains or reduces power lines in a region of the device based on a wiring demand value and a power demand value of the region. The wiring demand value of the region is based the wiring demand values of one or more locations of the device and the power demand value of the region is based on the power demand values for one or more locations of the device.

The above summary of the present invention is not intended to describe each illustrated embodiment or every implementation of the present invention. The figures in the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIGS. 1A and 1B illustrate the global and detail phase of a typical procedure for routing signal wires between integrated circuits on an integrated circuit device;

Figure 2:
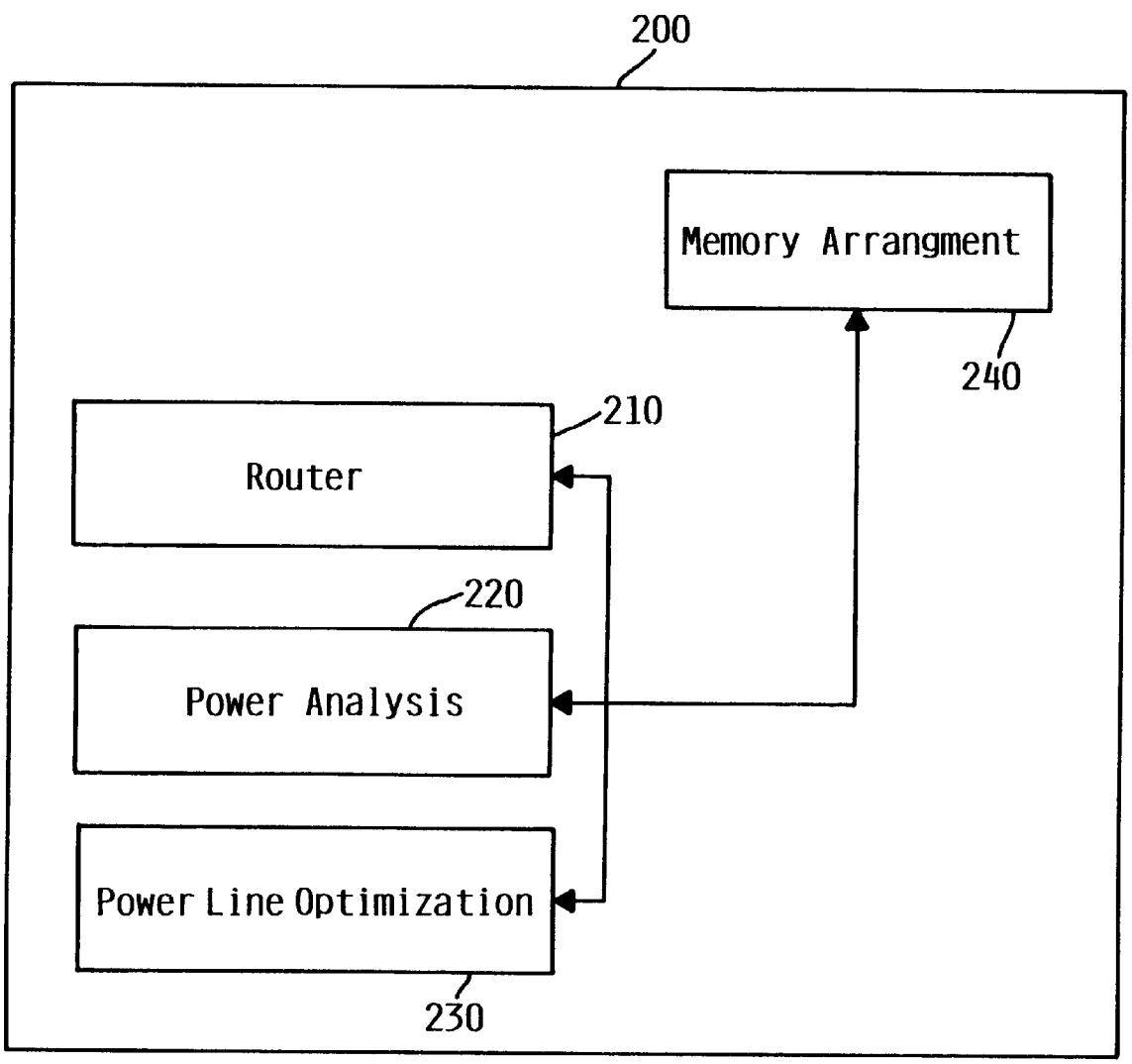
FIG. 2 illustrates an exemplary system in accordance with one embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention generally provides a system and method for selectively maintaining or varying power lines of an integrated circuit device. The system and method may do so by, for example, taking into account wiring demand and power demand of the device. While the present invention is not so limited, a better understanding of the invention will be found by reading the detailed description which follows.

FIG. 2 illustrates an exemplary system for designing an integrated circuit device in accordance with one embodiment of the invention. The system 200 includes a router module 210, a power analysis module 220 and a power line optimization module 230 which are interfaced with a memory arrangement 240. The modules 210, 220 and 230 as well as the memory arrangement 240 operate in conjunction with one or more processor systems (not shown). The arrangement of the system 200 can vary and does not limit the scope of the invention. For example, the system 200 may reside on a personal computer system in which case the processor system and memory arrangement 240 typically reside in the personal computer and the modules 210–230 are stored on a hard drive and loaded into the memory arrangement 240 during operation. The system 200 may also be implemented as a distributed system in which case one or more of the modules 210–230, memory arrangement 240 or processor system may be distributed across one or more different computer systems.

The router 210 generally routes signal wires between integrated circuits on the integrated circuit device using a predefined model of the integrated circuit device and a predefined layout of power lines for the integrated circuit device. The router 210 typically includes a global phase and a detail phase. In the global phase, the router 210 divides the integrated circuit device into cells, such as squares, and determines paths for signal wires between circuits based on the global cells. During this phase, the router 210 determines demand for signal wiring in each cell and saves the location of each cell and a value representing the demand for each cell in the memory arrangement 240. Each cell generally corresponds to a location of the integrated circuit device. The wiring demand value for each cell may, for example, correspond to the number of signal wires to be routed in the cell or a range of such numbers. In the detail phase, the router 210 routes detailed signal wires in the racks of the cells based on the global paths. One suitable router 210 includes G-Route™ from Cadence Design Systems, Inc., mentioned above.

The power analysis module 220 generally determines the power requirements of the integrated circuit device based on the predefined software model of the device. The power analysis module 220 typically divides the integrated circuit into cells and determines a power demand value for each cell. The power demand value may, for example, be the number of watts required by the cell or a range of watts required by the cell. Like the wiring demand cells, each power demand cell corresponds to a location of the integrated circuit device. In addition, there may be a 1:1 mapping or correspondence between the power demand cells and the wiring demand cells, if desired. The invention is, however, not so limited. The power analysis module 220 typically stores the power demand value for each cell and the cell location in the memory arrangement 240. A number of different circuit simulators may be used to determine the power demand requirements of an integrated circuit device. One suitable simulator is the SPECS (Simulation Program for Electronic Circuits and Systems) simulator. By way of example, a graphical illustration of the power demand requirements of an integrated circuit device will be discussed below.

The power line optimization module 240 can use the power demand values and the wiring demand values for the device to selectively maintain or vary the power lines in a region of the device based on the wiring demand in the region of the device and the power demand in the region of the device. The optimization module 240 may further take into consideration the criticality of a circuit in determining whether power lines near the circuit should be removed. An exemplary manner in which the power line module 240 may operate will be discussed with reference to FIG. 5 below.

Figure 3:
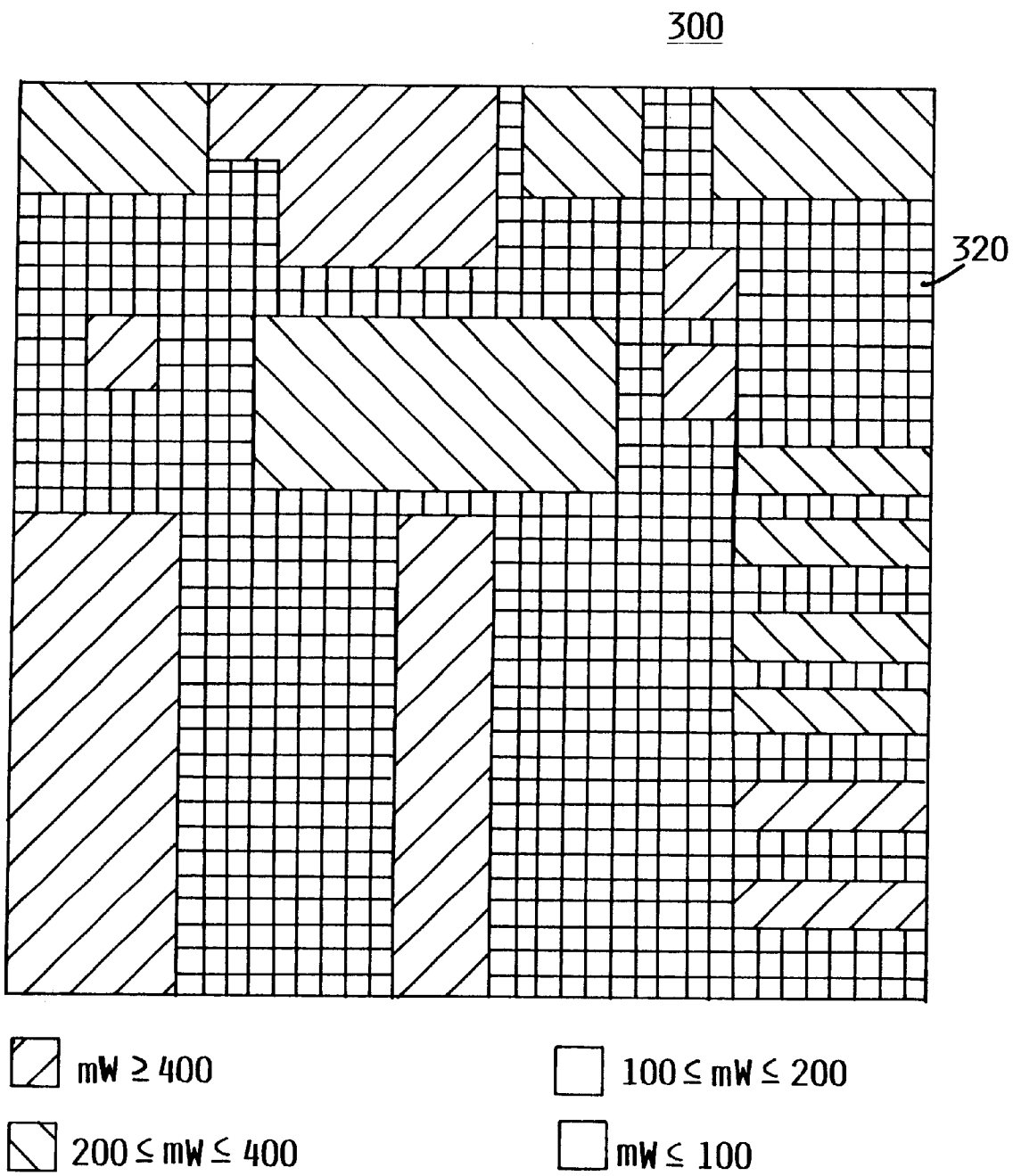
FIG. 3 illustrates an exemplary power demand map in accordance with one embodiment of the invention.
Figure 4:
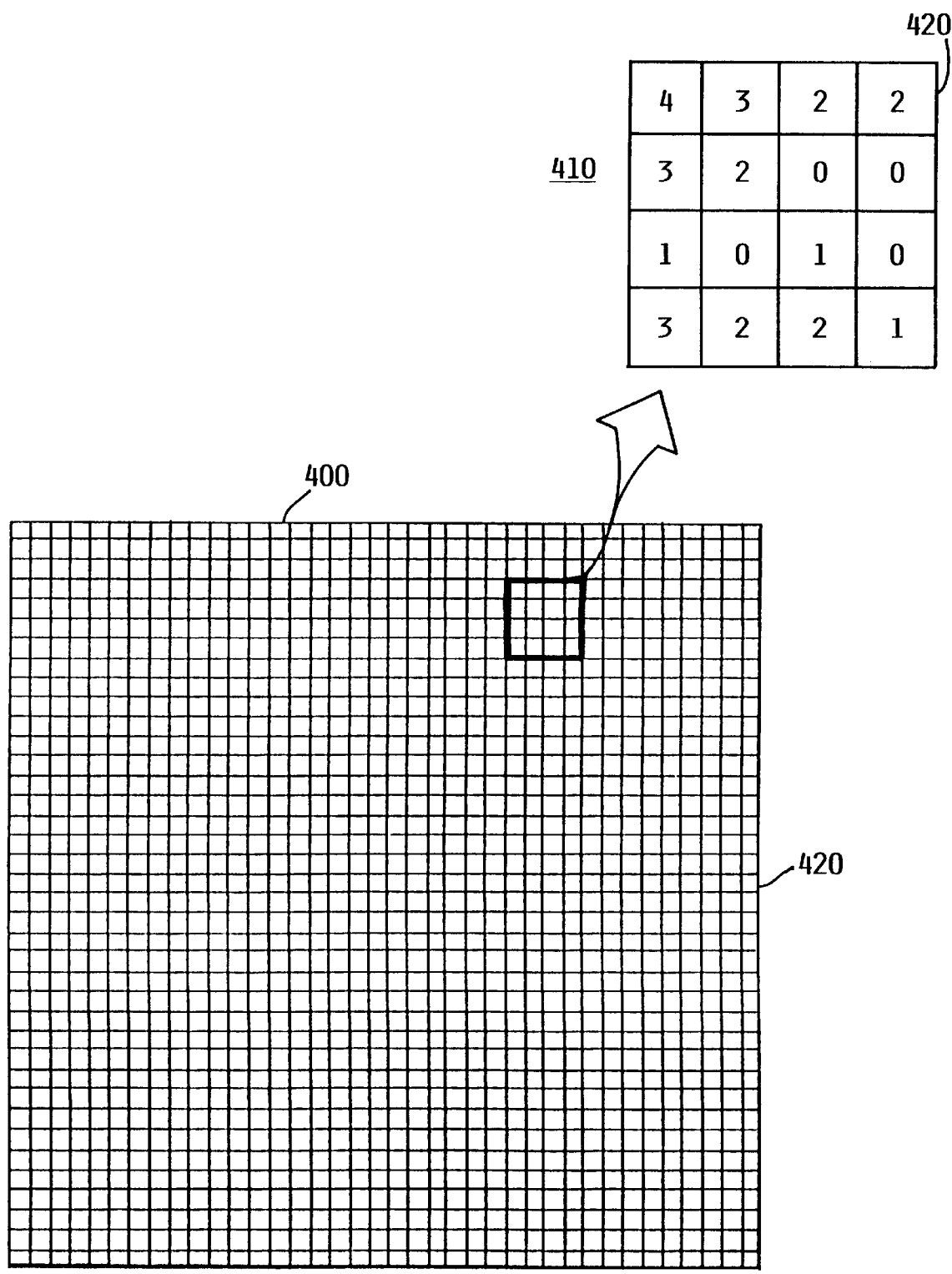
FIG. 4 illustrates an exemplary wiring demand map in accordance with another embodiment of the invention.

FIGS. 3 and 4, respectively, graphically illustrate maps of power demand and wiring demand for an exemplary integrated circuit device. The illustrated power demand map 300 shows the power requirements of the integrated circuit device through different shading. The map 300 further illustrates exemplary cells 320 each of which is associated with a power demand value, is this case the range indicated by the shading. The use of a range for the power demand value is provided by way of illustration only, and does not limit the invention. For instance the power demand value may be a specific number of watts for a cell, rather than a range. Further, the value may qualitatively characterize power demand such as high, medium, or low. The illustrated wiring demand map 400 shows the cells 420 defined by the router 210 and, in the enlarged section 410, the numbers indicating the wiring demand in each cell 420. Depending on the layout and number of the integrated circuits, each cell 420 may be associated with no global paths or multiple global paths. Accordingly, the number for a given cell 420 can range from zero (0) and up. Like the power demand value, the wiring demand value is not limited to any particular type. For instance, each wiring demand value may cover a range or may qualitative characterize the wiring demand in a location of the device.

Figure 5:
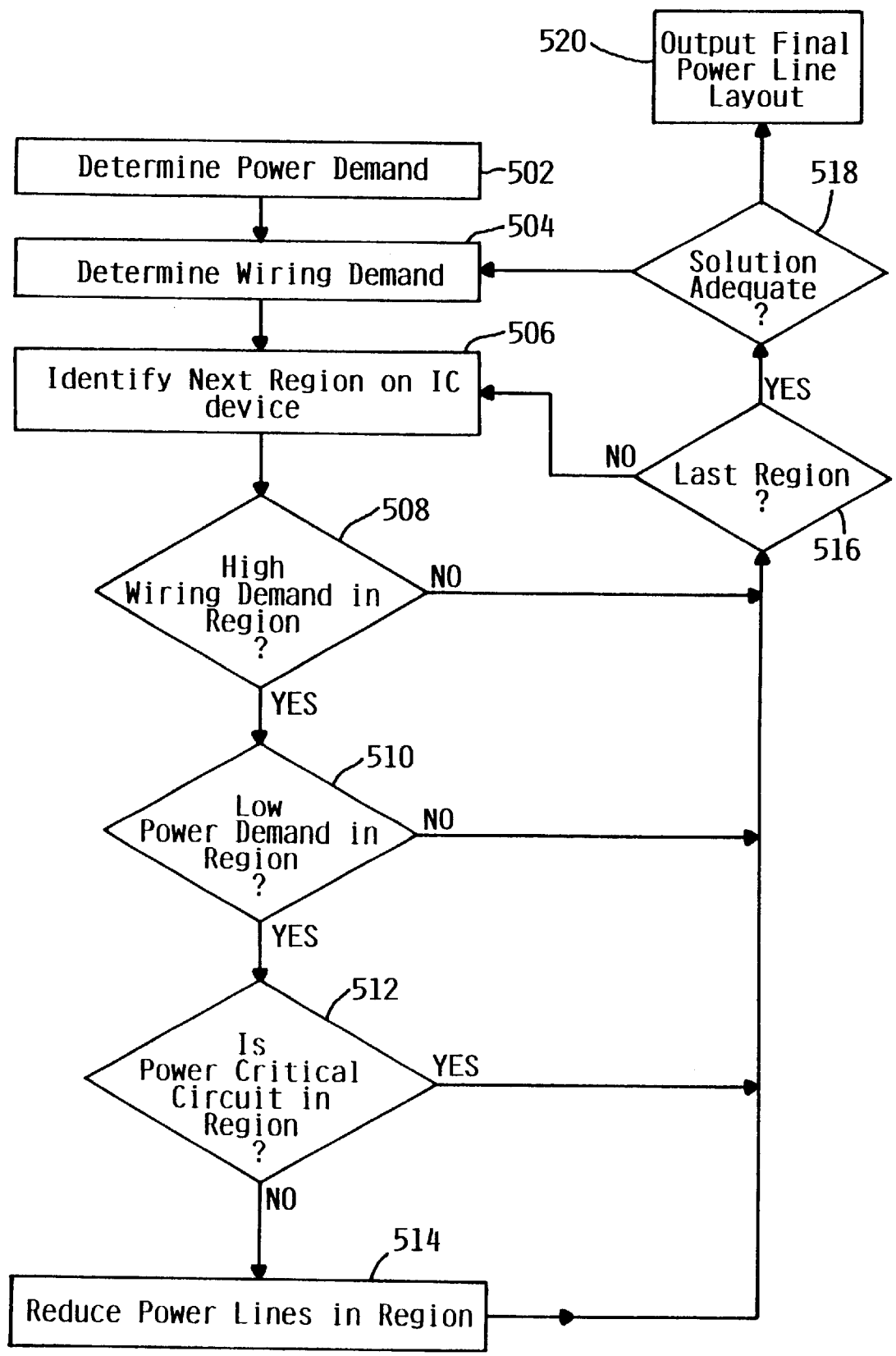
FIG. 5 illustrates an exemplary method in accordance with yet another embodiment of the invention.

FIG. 5 illustrates an exemplary method for designing an integrated circuit through selective reduction of power lines. This exemplary method will, by way of example, be illustrated in conjunction with the system 200 discussed above. Typically, prior to optimizing the power lines of the device, a circuit designer develops a software model containing the integrated circuits, their location and their interrelationship. The designer also typically defines a default layout of the power lines for the device and identifies any power critical circuits, such as Input/Output (I/O) devices. The power critical circuits may or may not be associated with a high power demand. As will be illustrated below, by identifying power critical circuits, power lines in regions of the device containing such circuits may maintained.

At block 502, the power analysis module 220 determines the power demand of the integrated circuit device. To do so, the power analysis module may divide the integrated circuit into cells and determine a power demand value (e.g., a number of watts) for each cell, as discussed above. Block 504 represents determining the wiring demand of the integrated circuit device. The wiring demand of the device is typically generated using the global phase of the router 210 based on the default power line layout. To do so, the router 210 may, for example, divide the device into cells and determine a wiring demand value for each cell, as discussed above. A region of the integrated circuit device is then selected for power line modification, as illustrated at block 506. The region may correspond to a particular cell of the wiring demand map and power demand map. Alternatively, the region may correspond to more than one cell. In the latter instance, the a power demand value and wiring demand value may, for example, be determined by averaging the values over the cells within the region.

The power line optimization module 230 then determines whether the wiring demand value of the selected region exceeds a predetermined threshold, as indicated at block 508. The wiring demand threshold is typically predefined based on the desired density of wiring demand and the type of integrated circuit being formed. If wiring demand is lower than the threshold, the power lines are left intact and control moves to block 516 where the optimization module 230 determines whether other regions of the device remain unchecked. If the wiring demand exceeds the threshold, control moves to block 510 where the optimization module 230 determines whether the power demand value of the region falls below a predetermined threshold. The power demand threshold, like the wiring demand threshold, is typically predefined based on the desired density of wiring demand and the type of integrated circuit being formed. If the power demand is higher than the predetermined threshold, the power lines are maintained and control moves to block 516 where the module determines whether additional regions remain to be checked. If the power demand value of the region is lower than the threshold, the power lines module 230 then checks whether the region contains a power critical circuit, as indicated at block 512. If so, the power lines in the region are not changed and control moves to block 516 where it is determined whether another region remains for analysis.

If the region does not contain a power critical circuit, then the power lines in the region are reduced as illustrated at block 514. This typically includes identifying any power lines in the region which do not interconnect with a lower metal line or transistor and removing the identified power lines. The power line layout file is also updated to reflect the reduction of power line and typically stored in memory.

After reducing the power lines, control moves to block 516 where the power line optimization module 230 determines whether additional regions remain for analysis. If so, control moves to block 506 where another region of the integrated circuit device is selected for analysis and the loop between blocks 506 and 516 is repeated. This loop is typically repeated until all regions of the integrated circuit device have been analyzed and, at that point, control moves to block 518 where the optimization module 230 determines whether an adequate solution has been reached in order to generate a final power line layout. This may include determining whether a predetermined count has been reached, whether a threshold level of signal wiring has been reached, or whether no further changes are made to the signal wiring.

If the solution is not adequate, control then moves to block 504 and the global phase of the router 210 recalculates the wiring demand for the device using the latest power line layout file (as modified at block 514). Control then moves to block 506 and the loop between block 506 and 518 is repeated to selectively reduce power lines based on wiring demand and generate a new power line layout. As noted above, this loop may be repeated a predetermined number of times, until a threshold level of signal wiring is reached, or until no further changes are made to the signal wiring in order to generate a final power line layout. If the solution is adequate, then the latest power line layout file (as modified at block 514) is output as the final power line layout file as indicated at blocks 518 and 520. The router 210 may then provide the detailed signal wires based on the final power line layout.

Figure 6A:
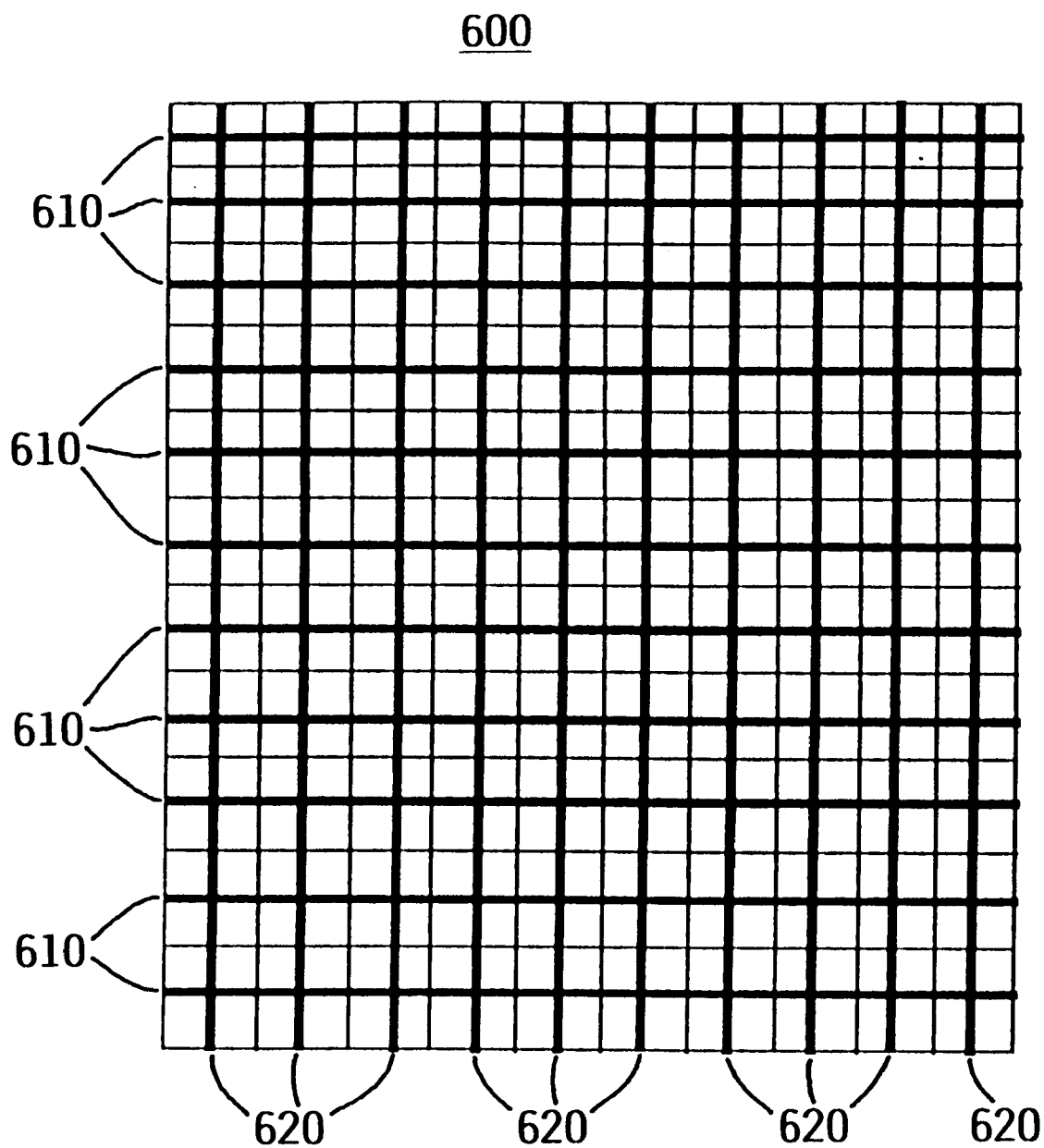
FIG. 6A and 6B illustrate an exemplary reduction of power lines in a region of an integrated circuit in accordance with yet another embodiment of the invention.
Figure 6B:
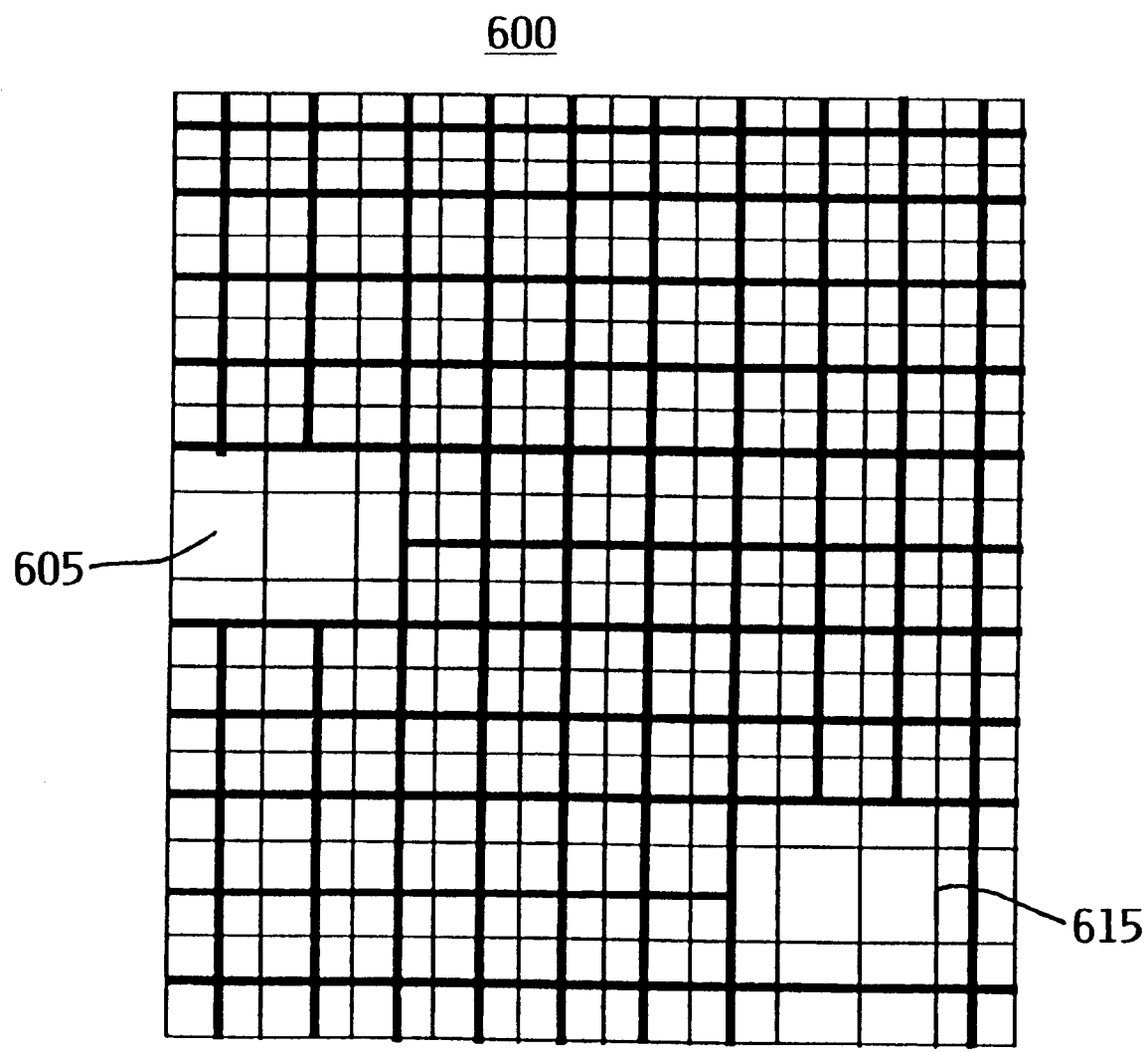

FIGS. 6A illustrates an exemplary layout of power lines 610 and 620 over a section 600 of an integrated circuit device before selective reduction. This layout may, for example, be stored in the default power line layout file. FIG. 6B illustrates an exemplary power line layout for the section 600 of the device after selective reduction of power lines. As can be seen, at regions 605 and 615, some of the power lines have been removed thereby freeing additional space for signal wires. These illustrations are intended to be exemplary and not to limit the scope of the invention. Moreover, while the power lines are illustrated in two (2) dimensions, it should be appreciated that the power lines 610 and 620 typically extend over a number different metal layers and are thus formed in three dimensional space. For instance, one or more metal layers may be associated with the vertical power lines 620 and one or more metal layers may be associated with the horizontal power lines 610.

Figure 7:
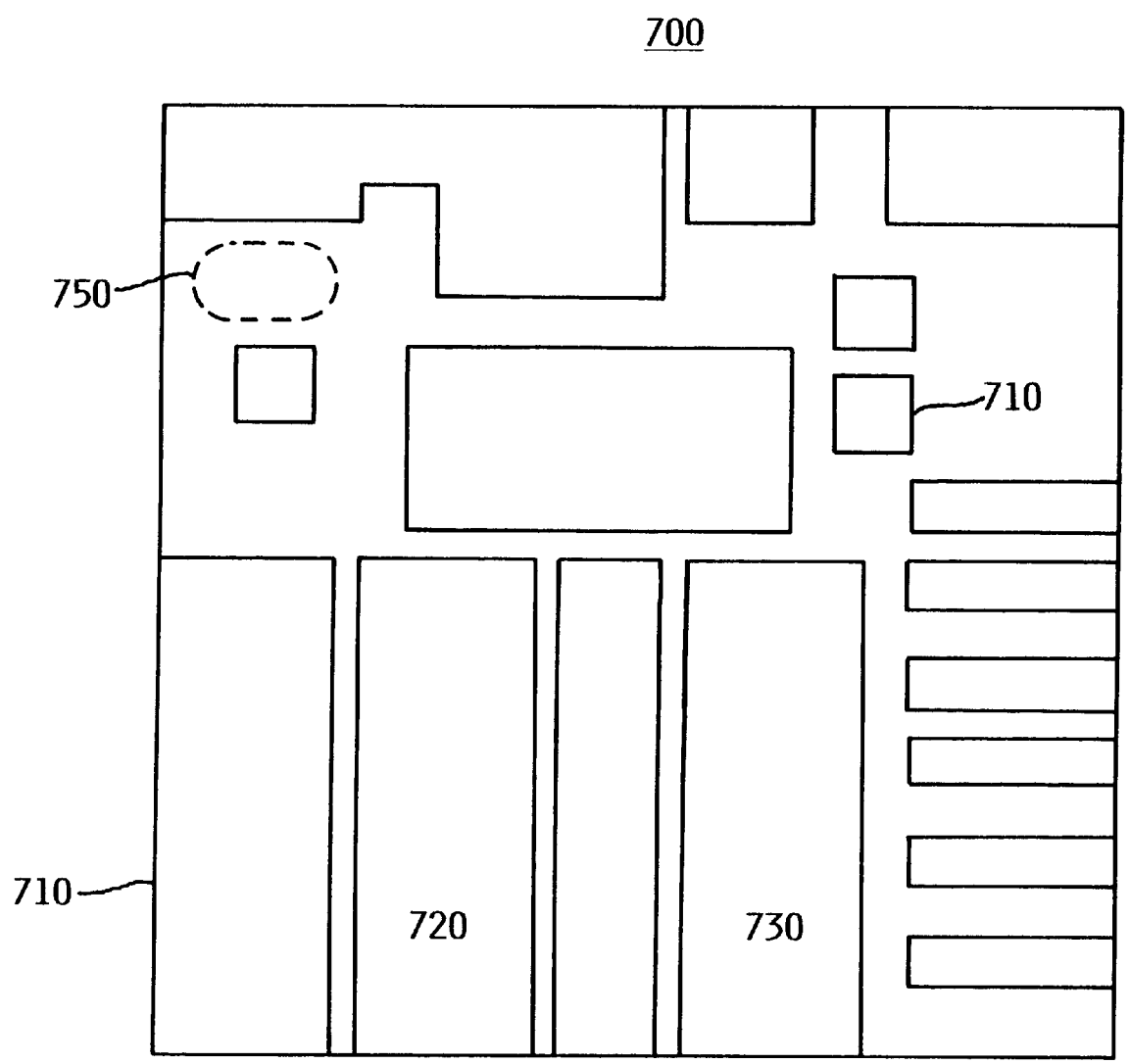
FIG. 7 illustrates an exemplary device in accordance with yet another embodiment of the invention.

After detailed routing of the signal wires, an integrated circuit device may then be fabricated using the final power line layout and the detailed signal wiring. An exemplary integrated circuit device formed in this manner is shown in FIG. 7. The exemplary device 700 includes a plurality of circuits including one or more higher powered circuits 710 associated with a high power demand and one or more lower powered circuits 720 associated with a low power demand. Disposed over the circuits are a plurality of power lines and signal wires (not shown). The power lines have a density over the lower powered circuit(s) 720 which is lower than a density of the power lines over the high powered circuit(s) 710, while the signal wires have a density over the lower powered circuit(s) 720 which is higher than a density of the signal wires over the higher powered circuit(s) 710. The device may further include one or more power critical circuits, such as lower power circuit 730 and middle power circuit 740 that have a power line density which it least as high as the power line density over the higher power circuits 710. The device may further include lower power regions, such as region 750, with a relatively high power line density (e.g., same density as the power lines over regions 710) by virtue of a low signal wire demand.

Using the above process, power lines on the integrated circuit device may be selectively removed based on the wiring demand of the device. The reduction of power lines allows for increases in the number of signal wires and therefore increase in the density of the integrated circuit device. Moreover, the above process allows the selective reduction of power lines to be performed taking into consideration power critical circuits or regions in order to assure adequate reliability and powering of the integrated circuit device.

It should be appreciated that the above system and method is provided is provided by way of example and not of limitation. A number of different techniques may be used to selectively maintain or vary power lines based on the wiring demand of an integrated circuit device. In the above method, for example, the order of the decision blocks 508–512 can vary without departing from the scope of the invention. For instance, the decision most likely resulting in maintaining the power lines (and moving to block 516) may be performed first in order to increase the speed of the operation. Moreover, the decision regarding power critical circuits may be omitted if desired. Additionally, in the exemplary system discussed above, a number of functional changes may be made without departing from the scope of the invention.

As noted above, the present invention is applicable to a number of different methods and systems for optimizing the number of power lines on an integrated circuit device. Accordingly, the present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

What is claimed is:

1. A method of designing a physical layout for wiring of an integrated circuit device, said integrated circuit device having a predetermined set of component devices assigned to respective physical locations on the integrated circuit device and a predetermined set of required wiring interconnections among said predetermined set of component devices, said method comprising:

(a) constructing a default layout of power lines in said integrated circuit device, said default layout being constructed without regard to power and wiring demand in local physical regions of said integrated circuit device;

(b) determining a respective power demand value for each of a plurality of physical regions of the integrated circuit device based on said predetermined set of component devices, each of said plurality of physical regions being substantially less than the entire physical area of said integrated circuit device;

(c) determining a respective wiring demand value for each said region of the integrated circuit device based on said predetermined set of required wiring interconnections; and (d) selectively reducing or maintaining power lines of the default layout of power lines in each of a plurality of regions of the integrated circuit device based on the respective wiring demand value and the respective power demand value in the region.

2. The method of claim 1, wherein selectively reducing or maintaining power lines includes determining whether the region includes a power critical circuit and if so, maintaining the power lines in the region.

3. The method of claim 1, wherein selectively reducing or maintaining power lines includes determining whether the power demand value of the region exceeds a power demand threshold and if so, maintaining the power lines in the region.

4. The method of claim 1, wherein selectively reducing or maintaining power lines includes determining whether the wiring demand value of the region falls below a wiring demand threshold and if so maintaining the power lines in the region.

5. The method of claim 1, where selectively reducing or maintaining the power lines includes reducing the power lines if the power demand value falls below a predetermined threshold, the wiring demand value exceeds a predetermined threshold, and the region fails to contain a power critical circuit.

6. The method of claim 1, further including repeating (b) through (d) for the entire device.

7. The method of claim 1, wherein determining the power demand value of the region includes using a power line layout for the device.

8. The method of claim 7, further including updating a power line layout after selectively reducing the power lines.

9. The method of claim 8, further including repeating (b) through (d) using the updated power line layout.

10. A system for designing a physical layout for wiring of an integrated circuit device, comprising:

a memory arrangement for recording a predetermined set of component devices assigned to respective physical locations on said integrated circuit device, a predetermined set of required wiring interconnections among said predetermined set of component devices, and a default layout of power lines in said integrated circuit device;

a power module for determining power demand values for locations of the intergrated circuit device based on said predetermined set of component devices;

a wiring module for determining wiring demand values for locations of the intergrated circuit device based on said predetermined set of required wiring interconnections; and a power line module for selectively maintaining or reducing power lines in each of a plurality of physical regions of the integrated circuit device based on a corresponding wiring demand value and a corresponding power demand value of each respective region, each of said plurality of physical regions being substantially less that the entire physical area of said integrated circuit device, the wiring demand value being based on one or more of the wiring demand values for locations of the intergrated circuit device and the power demand value of the region being based on one or more of the power demand values for locations of the intergrated circuit device.

11. The system of claim 10, wherein the power line module determines whether the region includes a power critical circuit and if so, maintains the power lines in the region.

12. The system of claim 10, wherein the power line module determines whether the power demand value of the region exceeds a power demand threshold and if so, maintains the power lines in the region.

13. The system of claim 11, wherein the power line module determines whether the wiring demand value of the region falls below a wiring demand threshold and if so maintains power lines in the region.

14. The method of claim 10, wherein the power line module reduces the power lines if the power demand value falls below a predetermined threshold, the wiring demand value exceeds a predetermined threshold, and the region fails to contain a power critical circuit.

15. The system of claim 10, wherein the power line module repeats selectively maintaining or reducing power lines for the entire intergrated circuit device.

16. The system of claim 10, wherein the wiring module determines the power demand values of locations of the device using a power line layout for the device.

17. The method system of claim 16, wherein the power line module generates a new power line layout, for use by the wiring module, after selectively reducing or maintaining the power lines of the intergrated circuit device.

18. The system of claim 17, wherein the wiring module determines new wiring demand values for the locations of the device using the new power line layout and the power module selectively maintains or reduces the power line for regions of the device based using the new wiring demand values for the locations of the device.

* * * * *